United States Patent
Satpute et al.

(10) Patent No.: US 10,607,572 B2
(45) Date of Patent: Mar. 31, 2020

(54) FREQUENCY SYNCHRONIZATION AND PHASE CORRECTION

(71) Applicant: QUALCOMM Incorporated, San Diego, CA (US)

(72) Inventors: Anand Prabhakar Satpute, Bangalore (IN); Sandeep Kanakapura Lakshmikantha, Bangalore (IN); Tushit Jain, Marathahalli (IN); Gwendolyn Denise Barriac, Encinitas, CA (US); Ajit Venkat Rao, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 15/968,481

(22) Filed: May 1, 2018

(65) Prior Publication Data

US 2019/0341004 A1    Nov. 7, 2019

(51) Int. Cl.
*G06T 15/00* (2011.01)
*G09G 5/12* (2006.01)

(52) U.S. Cl.
CPC ............. *G09G 5/12* (2013.01); *G06T 15/005* (2013.01); *G09G 2370/022* (2013.01); *G09G 2370/16* (2013.01)

(58) Field of Classification Search
CPC ............... G09G 5/12; G09G 2370/022; G09G 2370/16; G06T 15/005
See application file for complete search history.

(56) References Cited

U.S. PATENT DOCUMENTS

| | | | |
|---|---|---|---|
| 2014/0152676 A1* | 6/2014 | Rohn | H04N 13/341 345/520 |
| 2016/0093108 A1* | 3/2016 | Mao | A63F 13/42 345/633 |
| 2018/0342222 A1* | 11/2018 | Kang | G09G 3/3688 |

\* cited by examiner

*Primary Examiner* — Robert J Craddock
(74) *Attorney, Agent, or Firm* — Holland & Hart LLP

(57) ABSTRACT

Methods, systems, and devices for frequency synchronization and phase correction at a rendering device are described. One method may include receiving, from a display device (e.g., a head-mounted display (HMD) device), a vertical sync count and an indication of one or more frame repeats. The rendering device may estimate a vertical sync frequency based on the received vertical sync count, and determine a phase corresponding to a minimum frame repeat based on the indication of the one or more frame repeats. The rendering device may adjust a vertical sync frequency to the estimated vertical sync frequency and a phase to the determined phase. The rendering device may transmit one or more frames to the display device using the adjusted frequency and/or the adjusted phase.

20 Claims, 12 Drawing Sheets

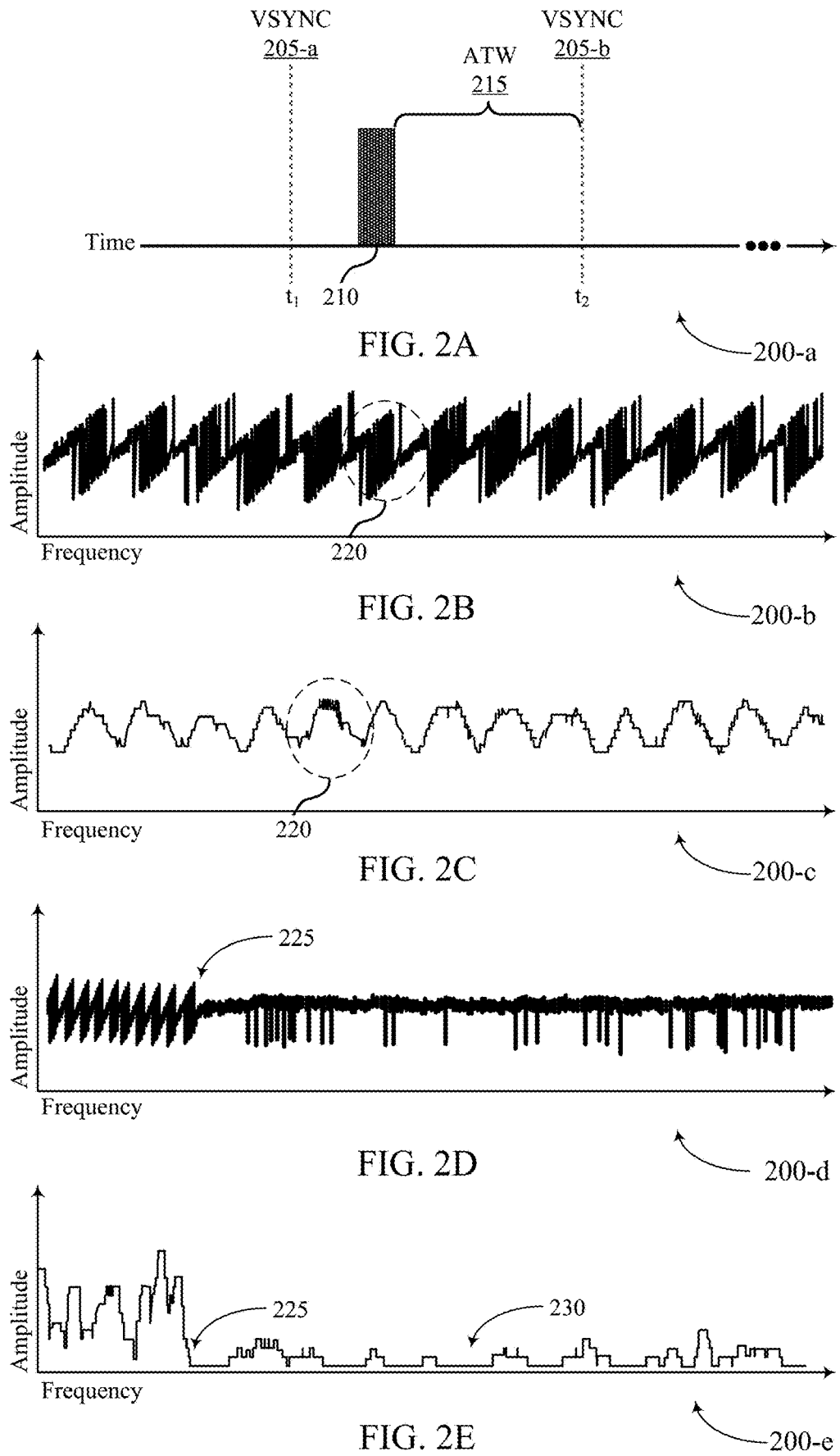

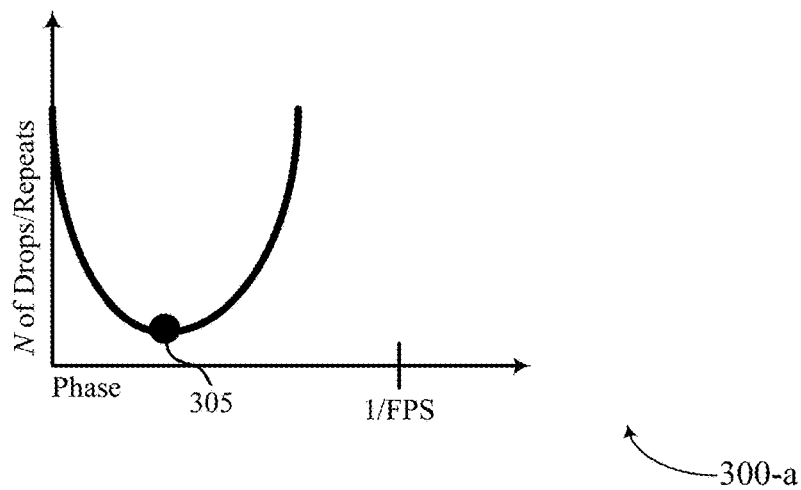
FIG. 3A
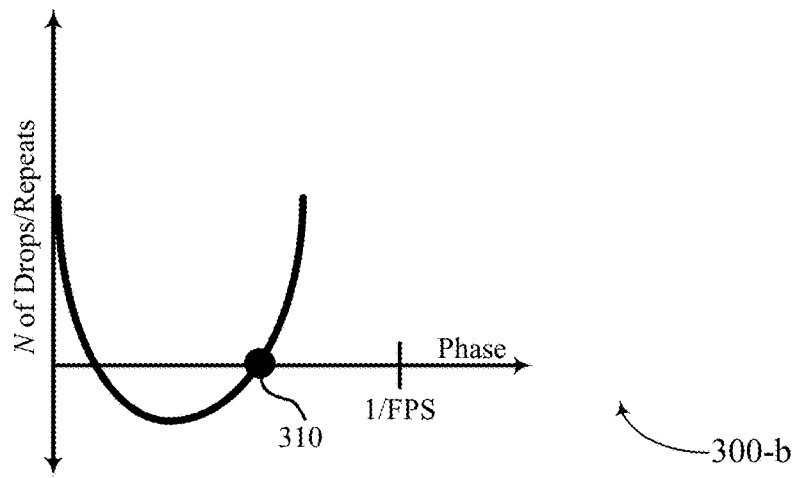
FIG. 3B
| NumFrameRepeats (%) | Direction | StepSize (ms) |
|---|---|---|
| > 20 | -1 | 3 |
| 15-20 | -1 | 2 |
| 10-15 | -1 | 1 |
| 5-10 | If ($N_{repeat}$ > $N_{repeat\_last}$) then direction = -direction | 1 |
| 1-5 | | 0.5 |
| 0 | 1 | 0.1 |
FIG. 3C

FREQUENCY SYNCHRONIZATION AND PHASE CORRECTION

BACKGROUND

A virtual reality (VR) system may include rendering hardware (e.g., a personal computer (PC)) and display hardware (e.g., a head-mounted display (HMD)), which support processing and providing a stereoscopic three dimensional (3D) visualization using digital or virtual image information. Some examples of VR systems may support a fully immersive VR experience, a non-immersive VR experience, or a collaborative VR experience. The quality of these different VR experiences may be affected by a frame repeat, which may create jitter in animations or a user translation and lead to degraded quality. Improving techniques for eliminating or mitigating frame repeat occurrences in VR systems may be desirable.

SUMMARY

The described techniques relate to improved methods, systems, devices, and apparatuses that support performing frequency synchronization and phase correction in split virtual reality (VR) systems. Specifically, the improved techniques described herein may reduce a frame repeat and motion-to-render-to-photon (M2R2P) latency by syncing frequencies between a first device such as a rendering device (e.g., a PC) and second device such as a display device (e.g., a head mounted display (HMD)), and correcting a phase between the first device and the second device.

A method for performing frequency synchronization and phase correction at a rendering device is described. The method may include receiving, from a display device, a vertical sync count and an indication of one or more frame repeats, estimating a vertical sync frequency based at least in part on the received vertical sync count, determining a phase corresponding to a minimum frame repeat based at least in part on the indication of the one or more frame repeats, adjusting a vertical sync frequency of the rendering device to the estimated vertical sync frequency and a phase of the rendering device to the determined phase, and transmitting one or more frames to the display device using the adjusted frequency and the adjusted phase.

A rendering device for performing frequency synchronization and phase correction is described. The rendering device may include a processor, a memory in electronic communication with the processor, and instructions stored in the memory and executable by the processor to cause the rendering device to: receive, from a display device, a vertical sync count and an indication of one or more frame repeats, estimate a vertical sync frequency based at least in part on the received vertical sync count, determine a phase corresponding to a minimum frame repeat based at least in part on the indication of the one or more frame repeats, adjust a vertical sync frequency of the rendering device to the estimated vertical sync frequency and a phase of the rendering device to the determined phase, and transmit one or more frames to the display device using the adjusted frequency and the adjusted phase.

An apparatus for performing frequency synchronization and phase correction is described. The apparatus may include means for receiving, from a display device, a vertical sync count and an indication of one or more frame repeats, estimating a vertical sync frequency based at least in part on the received vertical sync count, determining a phase corresponding to a minimum frame repeat based at least in part on the indication of the one or more frame repeats, adjusting a vertical sync frequency of the apparatus to the estimated vertical sync frequency and a phase of the apparatus to the determined phase, and transmitting one or more frames to the display device using the adjusted frequency and the adjusted phase.

A non-transitory computer-readable medium storing code that supports performing frequency synchronization and phase correction at a rendering device is described. The code may include instructions executable by a processor to receive, from a display device, a vertical sync count and an indication of one or more frame repeats, estimate a vertical sync frequency based at least in part on the received vertical sync count, determine a phase corresponding to a minimum frame repeat based at least in part on the indication of the one or more frame repeats, adjust a vertical sync frequency of the rendering device to the estimated vertical sync frequency and a phase of the rendering device to the determined phase, and transmit one or more frames to the display device using the adjusted frequency and the adjusted phase.

Some examples of the method, rendering device, apparatus, and non-transitory computer-readable medium described herein may further include operations, features, means, or instructions for comparing the vertical sync count and a preceding vertical sync count received from the display device over a time interval. In some examples of the method, rendering device, apparatus, and non-transitory computer-readable medium described herein, estimating the vertical sync frequency is further based at least in part on the comparing.

Some examples of the method, rendering device, apparatus, and non-transitory computer-readable medium described herein may further include operations, features, means, or instructions for identifying a quantity of predicted frames (P-frames) and a quantity of intra-frames (I-frames), initiating rendering the I-frames at a first time, initiating rendering the P-frames at a second time after the first time, and transmitting the I-frames and the P-frames to the display device based at least in part on initiating the rendering such that the rendered I-frames arrive at the display device at a same phase as the P-frames. In some examples of the method, rendering device, apparatus, and non-transitory computer-readable medium described herein, the one or more frames comprise at least one of the P-frames and at least one of the I-frames.

Some examples of the method, rendering device, apparatus, and non-transitory computer-readable medium described herein may further include operations, features, means, or instructions for determining a quantity of frame repeats occurring within a time interval based at least in part on the indication, determining the minimum frame repeat based at least in part on the quantity of frame repeats occurring within the time interval, and identifying a phase corresponding to the determined minimum frame repeat.

Some examples of the method, rendering device, apparatus, and non-transitory computer-readable medium described herein may further include operations, features, means, or instructions for comparing the quantity of frame repeats, one or more vertical syncs, or a frame frequency, or a combination thereof. In some examples of the method, rendering device, apparatus, and non-transitory computer-readable medium described herein, determining the minimum frame repeat and identifying the phase corresponding to the minimum frame repeat is further based at least in part on the comparison.

Some examples of the method, rendering device, apparatus, and non-transitory computer-readable medium described herein may further include operations, features, means, or instructions for generating a phase model representing a relationship between the quantity of frame repeats, one or more vertical syncs, or a frame frequency, or a combination thereof.

Some examples of the method, rendering device, apparatus, and non-transitory computer-readable medium described herein for determining the phase corresponding to the minimum frame repeat may further include operations, features, means, or instructions for determining the minimum frame repeat using the phase model based at least in part on comparing values across the phase model, and identifying a phase corresponding to the determined minimum frame repeat using the phase model.

Some examples of the method, rendering device, apparatus, and non-transitory computer-readable medium described herein for iterating across the phase model may further include operations, features, means, or instructions for selecting a step size from a set of step sizes for comparing values across the phase model, determining a direction for comparing values across the phase model based at least in part on the quantity of frame repeats occurring within the time interval, and iterating across the phase model using the selected step size and in the determined direction.

Some examples of the method, rendering device, apparatus, and non-transitory computer-readable medium described herein for determining the direction may further include operations, features, means, or instructions for comparing the quantity of frame repeats occurring within the time interval to a second quantity of frame repeats occurring within a previous time interval.

Some examples of the method, rendering device, apparatus, and non-transitory computer-readable medium described herein may further include operations, features, means, or instructions for determining that the quantity of frame repeats occurring within the time interval are below a threshold, and reducing an asynchronous time wrap (ATW) by shifting the identified phase closer to a vertical sync node of the phase model based at least in part on the quantity of frame repeats occurring within the time interval being below the threshold.

Some examples of the method, rendering device, apparatus, and non-transitory computer-readable medium described herein for estimating the vertical sync frequency may further include operations, features, means, or instructions for determining a vertical sync count difference between the vertical sync count and a preceding vertical sync count received from the display device, and determining a quotient of the vertical sync count difference and the time interval, wherein the quotient comprises the estimated vertical sync frequency. In some examples of the method, rendering device, apparatus, and non-transitory computer-readable medium described herein, the vertical sync count and the preceding vertical sync count are received during a time interval.

Some examples of the method, rendering device, apparatus, and non-transitory computer-readable medium described herein may further include operations, features, means, or instructions for determining a timing of at least two vertical sync counts. In some examples of the method, rendering device, apparatus, and non-transitory computer-readable medium described herein, determining the phase corresponding to the minimum frame repeat is performed during a time interval corresponding to the at least two vertical sync counts.

Some examples of the method, rendering device, apparatus, and non-transitory computer-readable medium described herein may further include operations, features, means, or instructions for setting a duration of an ATW based at least in part on the adjusted vertical sync frequency of the rendering device.

In some examples of the method, rendering device, apparatus, and non-transitory computer-readable medium described herein, a duration of an asynchronous time wrap (ATW) is based at least in part on the one or more frames arriving at the display device before or after a vertical sync.

BRIEF DESCRIPTION OF THE DRAWINGS

FIGS. 2A through 2E show examples of timing information and M2R2P graphs in a split VR system that supports performing frequency synchronization and phase correction in accordance with aspects of the present disclosure.

FIGS. 3A through 3C show examples of a phase diagram and a table that supports performing frequency synchronization and phase correction in accordance with aspects of the present disclosure.

DETAILED DESCRIPTION

A split virtual reality (VR) system may include a rendering device and a display device. Some examples of split VR systems may support a fully immersive VR experience, a non-immersive VR experience, or a collaborative VR experience. The quality of these different VR experiences may be affected by one or more frame repeats, which may be due to frequency and phase differences between the rendering device and the display device. To synchronize frequencies, the rendering device may estimate a frequency using a received vertical sync count from the display device, and match a vertical sync frequency with the display device. The rendering device may also adjust a phase using frame repeat information (e.g., statistics) received from a source (e.g., the display device) for reducing or eliminating a frame repeat. In some cases a frame repeat in the split VR system may be due to a size of an I-frame being bigger compared to a P-frame. To compensate for the size difference, I-frames may be rendered by the rendering device earlier so that they reach the display device at the same phase as P-frames.

Aspects of the disclosure are initially described in the context of a split VR system. Aspects of the disclosure are further illustrated by and described with reference to apparatus diagrams, system diagrams, and flowcharts that relate to a device performing frequency synchronization and phase correction.

Figure 1:
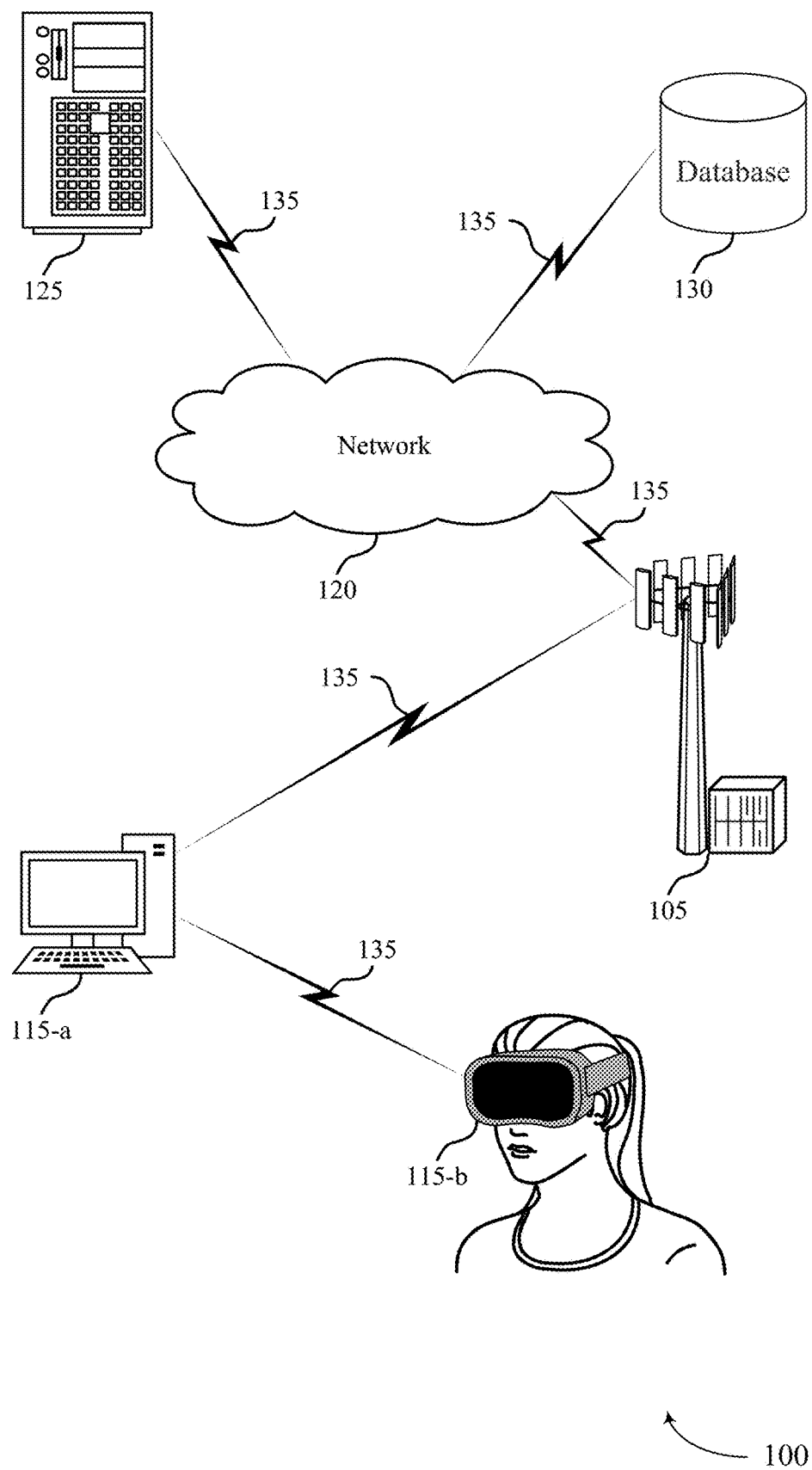
FIG. 1 illustrates an example of a split virtual reality (VR) system that supports performing frequency synchronization and phase correction in accordance with aspects of the present disclosure.

FIG. 1 illustrates an example of a split VR system 100 that supports performing frequency synchronization and phase correction in accordance with aspects of the present disclosure. The split VR system 100 may include a base station 105, a rendering device 115-a, a display device 115-b, a server 125, and a database 130. The rendering device 115-a may be stationary and/or mobile. In some examples, the rendering device 115-a may be a personal computing device, a desktop, a laptop, mobile computing device, or a head mounted display (HMD), etc. The rendering device 115-a may additionally, or alternatively, include or be referred to by those skilled in the art as a user equipment (UE), a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

The rendering device 115-a may include memory, a processor, an output, and a communication module. The memory may be, for example, a random-access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth storing a set of processor-readable instructions that may be stored at the memory and executed at the processor) associated with executing an application, such as, for example, performing frequency synchronization and phase correction. The processor may be a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), and/or the like. The processor may be configured to allocate graphics resources, handle audio and/or video streams, and/or render multimedia content (e.g., render audio and/or video streams (e.g., frames)) for a VR experience as described herein. For example, the rendering device 115-a may communicate one or more frames with the display device 115-b to provide a VR experience. A frame may be a stereoscopic three dimensional (3D) visualization that is transmitted to the display device 115-b for presentation.

The display device 115-b may be an HMD. As an HMD, the display device 115-b may be worn by a user. In some examples, the display device 115-b may be configured with one or more sensors to sense a position of the user and/or an environment surrounding the HMD to generate information when the user is wearing the HMD. The information may include movement information, orientation information, angle information, etc. regarding the display device 115-b. In some cases, the display device 115-b may be configured with a microphone for capturing audio and one or more speakers for broadcasting audio. The display device 115-b may also be configured with a set of lenses and a display screen for the user to view and be part of the VR experience.

The split VR system 100 may also include a base station 105, a server 125, and a database 130. The server 125 may be a computing system or an application that may be an intermediary node in the split VR system 100 between the rendering device 115-a, or the display device 115-b, or the database 130. The server 125 may include any combination of a data server, a cloud server, a server associated with a VR service provider, proxy server, mail server, web server, application server (e.g., gaming application server), database server, communications server, home server, mobile server, or any combination thereof. The server 125 may also transmit to the rendering device 115-a or the display device 115-b a variety of VR information, such as rendering instructions, configuration information, control instructions, and other information, instructions, or commands relevant to performing frequency synchronization and phase correction between the rendering device 115-a and the display device 115-b.

The database 130 may store data that may include graphics resources, audio and/or video streams, and/or rendered multimedia content (e.g., rendered audio and/or video streams (e.g., frames)) for a VR environment, or commands relevant to frequency synchronization and phase correction for the rendering device 115-a and/or the display device 115-b. The rendering device 115-a and the display device 115-b may retrieve the stored data from the database via the base station 105.

The network 120 that may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)) for example), etc. Network 120 may include the Internet.

The base station 105 may wirelessly communicate with the rendering device 115-a and the display device 115-b via one or more base station antennas. Base station 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The rendering device 115-a and the display device 115-b described herein may be able to communicate with various types of base stations and network equipment including macro eNBs, small cell eNBs, gNBs, relay base stations, and the like.

In some cases, the rendering device 115-a and the display device 115-b may also be able to communicate wirelessly or directly (e.g., through a direct interface) with each other. For example, the rendering device 115-a and the display device 115-b may be able to communicate directly with each other (e.g., using a peer-to-peer (P2P) or device-to-device (D2D) protocol) or another device such as: a user equipment (UE), a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

The wireless communication links 135 shown in the split VR system 100 may include uplink (UL) transmissions from the rendering device 115-*a* and/or the display device 115-*b* to the base station 105, or the server 125, and/or downlink (DL) transmissions, from the base station 105 or the server 125 to the rendering device 115-*a* and the display device 115-*b*. The downlink transmissions may also be called forward link transmissions while the uplink transmissions may also be called reverse link transmissions. The wireless communication links 135 may transmit bidirectional communications and/or unidirectional communications. Wireless communication links 135 may include one or more connections, including but not limited to, 345 MHz, Wi-Fi, BLUETOOTH®, BLUETOOTH® Low Energy, cellular, Z-WAVE®, 802.11, peer-to-peer, LAN, wireless local area network (WLAN), Ethernet, FireWire®, fiber optic, and/or other connection types related to wireless communication systems.

FIGS. 2A through 2E show examples of a timing diagram 200-*a* and M2R2P graphs 200-*b* through 200-*e* in a split VR system that supports performing frequency synchronization and phase correction in accordance with aspects of the present disclosure. With reference to FIG. 1, in some examples, the rendering device 115-*a* and/or the display device 115-*b* may experience a frame repeat. A frame repeat may result from a frame arriving late at the rendering device 115-*a* and/or the display device 115-*b* (e.g., an HMD device). Frame repeats may degrade a quality of a VR experience, because a repeated frame may be a warped version of a previous frame. For example, repeated frames can create jitter in rendered content (e.g., rendered audio and/or video streams) in case of animations or when there is user translation (e.g., movement). The rendering device 115-*a* and/or the display device 115-*b* may warp the reused frame before displaying it to a user via the display device 115-*b*, to provide a more accurate depiction of a user translation at the time of display than the rendered previous frame alone.

FIG. 2A shows an example of a timing diagram 200-*a*. With reference to FIG. 2A, a frame may be warped relative to its arrival time before or after a vertical sync 205. The vertical sync 205 may be a trigger for the rendering device 115-*a* to render and transmit a newly rendered frame, which may then be transmitted to the display device 115-*b*, while another frame may be being rendered. For the display device, the vertical sync 205 may be a trigger to update a display (e.g., frame representing a VR environment). In some cases, if a frame 210 arrives before a vertical sync 205-*a*, the rendering device 115-*a* and/or the display device 115-*b* may drop or warp the frame 210. Additionally, if the frame 210 arrives after a vertical sync 205-*b*, the rendering device 115-*a* and/or the display device 115-*b* may drop or warp the frame 210. Alternatively, in some cases, if the frame 210 arrives within a threshold time (e.g., M milliseconds (ms)) before or after the vertical sync 205-*a* and/or 205-*b*, the rendering device 115-*a* and/or the display device 115-*b* may refrain from dropping or having to warp the frame 210.

The split VR system 100 may also be configured with an asynchronous time warp (ATW) wait time, for example, ATW 215. During the ATW 215, subsequent frames may not be repeated or dropped. In some cases, the ATW 215 may be configurable. For example, if the frame 210 arrives within the threshold time before the vertical sync 205-*a*, the ATW 215 may have a smaller duration compared to if the frame 210 arrived after the vertical sync 205-*a*. In some cases, the frame 210 may miss the vertical sync 205-*a* and/or the vertical sync 205-*b* due to differences in frequencies of the rendering device 115-*a* and the display device 115-*b*.

FIG. 2B shows an example of an M2R2P graph 200-*b*. The M2R2P graph 200-*b* may follow a sawtooth pattern corresponding to an M2R2P latency, which may be due to a frequency of the rendering device 115-*a* and a frequency of the display device 115-*b* being different. A phase of the M2R2P graph 200-*b* may also change with every frame. In some cases, the rendering device 115-*a* and/or the display device 115-*b* may miss the vertical sync 205-*a* and/or the vertical sync 205-*b* when the phase is near an edge 220 of the M2R2P graph 200-*b*.

FIG. 2C shows an example of a M2R2P graph 200-*c*, which may be a zoomed-in perspective of the M2R2P graph 200-*b*. For example, at the edge 220, the rendering device 115-*a* and/or the display device 115-*b* may experience jitter that may cause the frame 210 to miss the vertical syncs 205. As a result, the rendering device 115-*a* and/or the display device 115-*b* may drop the frame 210 and reuse a previous frame. In some examples, a percentage of frame repeats and/or drops at edges of the graph 200-*b* may be 30%. Thereby, this percentage of frame repeats and/or drops may impact the quality of the VR experience.

To decrease or eliminate frame repeat occurrences in the split VR system 100, the rendering device 115-*a* may synchronize its rendering frequency with a refresh frequency of the display device 115-*b*. By synchronizing frequencies with the display device 115-*b*, the rendering device 115-*a* may reduce a duration of the ATW 215, as well as a number of frame repeat occurrences. The display device 115-*a* may monitor for one or more frame repeats and a vertical sync count. For example, a vertical sync may be a periodic occasion. Thereby, the display device 115-*b* may be aware of when to expect frames from the rendering device 115-*a*. In some cases, the display device 115-*b* may be configured with a counter to track a quantity of frame repeats associated with a vertical sync 205. The display device 115-*a* may transmit, periodically or aperiodically, a vertical sync count and an indication of one or more frame repeats to the rendering device 115-*a*. The rendering device 115-*a* may estimate a vertical sync frequency based on the vertical sync count, and adjust a render frequency of the rendering device 115-*a* to the estimated vertical sync frequency. As a result, a render frequency of the rendering device 115-*a* and a refresh frequency of the display device 115-*b* may be synched.

The rendering device 115-*a* may determine a vertical sync count difference between a vertical sync count and a preceding vertical sync count received from the display device 115-*b*. The vertical sync count and the preceding vertical sync count may be received during a time interval, for example, a period between two consecutive or nonconsecutive vertical syncs 205. The rendering device 115-*a* may determine a quotient of the vertical sync count difference and the time interval to obtain the estimated vertical sync frequency. For example, the rendering device 115-*a* may estimate the vertical sync frequency ($F_{vsync}$) using the following equation:

$$F_{vsync} = \frac{VsyncCount_n - VsyncCount_{n-1}}{\Delta T}$$

where $VSyncCount_n$ is a current vertical sync count, $VSyncCount_{n-1}$ is a preceding vertical sync count, and $\Delta T$ is a time interval. In some examples, the time interval may correspond to a timing between at least two vertical sync counts 205. The rendering device 115-a may, in some cases, set a duration of the ATW 215 based on the adjusted vertical sync frequency.

FIG. 2D shows an example of a M2R2P graph 200-d, which may be an improved version of the M2R2P graph 200-c (e.g., following a reduced sawtooth pattern) corresponding to a synched frequency and phase correction (e.g., as described with reference to FIGS. 3A through 3C) between the rendering device 115-a and the display device 115-b.

FIG. 2E shows an example of an M2R2P graph 200-e, which may be a zoomed in perspective of the M2R2P graph 200-d. As illustrated in FIG. 2E, the percentage of frame repeats and drops may be reduced as a result of the synched frequency and phase correction between the rendering device 115-a and the display device 115-b. For instance, at edges 225 and 230 of the M2R2P graph 200-e, the percentage of frame repeats and/or drops may be less than 2%. As such, by synchronizing frequencies between the rendering device 115-a and the display device 115-b, the split VR system 100 may experience reduced or no frame repeat occurrences.

FIGS. 3A through 3C show examples of a phase model 300-a and/or 300-b and a table 300-c that supports performing frequency synchronization and phase correction in accordance with aspects of the present disclosure. The rendering device 115-a may adjust a phase using the indication of one or more frame repeats received from the display device 115-b and the phase model 300-a/300-b and/or the table 300-c, to decrease or eliminate frame repeat occurrences in the split VR system 100. By correcting the phase of the rendering device 115-a, a duration of the ATW 215 may be reduced, as well as a number of frame repeat occurrences.

With reference to FIG. 3A, the phase model 300-a may correspond to a high jitter scenario, and with reference to FIG. 3B, the phase model 300-b may correspond to a low jitter case. The rendering device 115-a may generate the phase model 300-a and/or the phase model 300-b based on the received indication of the one or more frame repeats from the display device 115-b. The rendering device 115-a may determine a phase corresponding to a minimum frame repeat using the phase model 300-a and/or the phase model 300-b. In some cases, the rendering device 115-a may calculate a quantity of frame repeats occurring within a time interval based on the indication and generate the phase model 300-a based on the calculation. The rendering device 115-a may determine the minimum frame repeat using the phase model 300-a including comparing the quantity of frame repeats, one or more vertical syncs, or a frame frequency, or a combination thereof to identify a phase corresponding to a minimum frame repeat.

To identify a phase corresponding to the minimum frame repeat using the phase model 300-a and/or the phase model 300-b, the rendering device 115-a may also use table 300-c, as referenced with respect to FIG. 3C. For example, identifying a phase corresponding to the minimum frame repeat using the phase model 300-a and/or the phase model 300-b may be an iterative method. The rendering device 115-a may determine a set of initial conditions (e.g., a step size and direction). The rendering device 115-a may select a step size and a direction using the table 300-c for comparing values across the phase model 300-a and/or the phase model 300-b. For example, the rendering device 115-a may calculate the quantity of frame repeats occurring within a time interval based on the indication and map the quantity to a NumFrameRepeats field in the table 300-c.

The mapped NumFrameRepeats field may correspond to a direction and step size in the table 300-c. For example, if the quantity of frame repeats maps to a NumFrameRepeats field corresponding to >20%, 15-20%, or 10-15% the step size may be at least one of 3 ms, 2 ms, or 1 ms and the direction may be in a negative direction. Alternatively, if the quantity of frame repeats maps to a NumFrameRepeats field corresponding to 5-10% or 1-5%, the step size may be at least 1 ms or 0.5 ms to remain in sync and reach a minima, and the direction may be in a positive direction or negative direction. For example, if the quantity of frame repeats is greater than a preceding quantity of frame repeats, the direction for iterating across the phase model 300-b may be in a negative direction. Otherwise, the direction may be positive. In addition, if the quantity of frame repeats maps to a NumFrameRepeats field corresponding to 0%, the step size may be 0.1 ms to further reduce an ATW wait time for achieving lesser M2R2P latency, and the direction may be in a positive direction. In some cases, the direction may be in only one direction for faster identifying a phase corresponding to a minimum frame repeat.

In some cases, the rendering device 115-a may be capable of identifying a phase corresponding to a minimum frame repeat based on using a graphical model or another representation. In some cases, the rendering device 115-a may be capable of identifying a phase corresponding to a minimum frame repeat based on using a numerical approach. For example, the rendering device 115-a may determine a quantity of frame repeats occurring within a time interval based on the indication and generate a table or list. The rendering device 115-a may perform an analysis operation on the generated table or list including comparing values in the generated table or list to identify a phase that may correspond to a minimum frame repeat.

After selecting the step size and determining a direction for comparing values (e.g., phase values), the rendering device 115-a may iterate across the phase model 300-a and/or the phase model 300-b using the selected step size and in the determined direction. With reference to FIG. 3A, the rendering device 115-a may identify a phase 305 that may correspond to a minimum frame repeat based on the iterating. The phase 305 may be at the center (e.g., minimum) of the phase model 300-a, which may be between at least two vertical nodes. Frame repeats may be at a minimum using the phase 305 for the rendering device 115-a.

With reference to FIG. 3B, the rendering device 115-a may identify a phase 310 that may correspond to a minimum frame repeat based on the iterating. In some cases, the rendering device 115-a may determine that the quantity of frame repeats, corresponding to the phase model 300-b, occurring within a time interval are below a threshold. As such, the rendering device 115-a may reduce an ATW (e.g., ATW 215, with reference to FIG. 2A) by shifting the phase 310 close to a vertical sync node of the phase model 300-b. The amount of shifting may be user-defined or system-defined. For example, the rendering device 115-a may determine a step size to shift the phase 310 to a vertical sync node based at least in part on the quantity of frame repeats.

Figure 4:
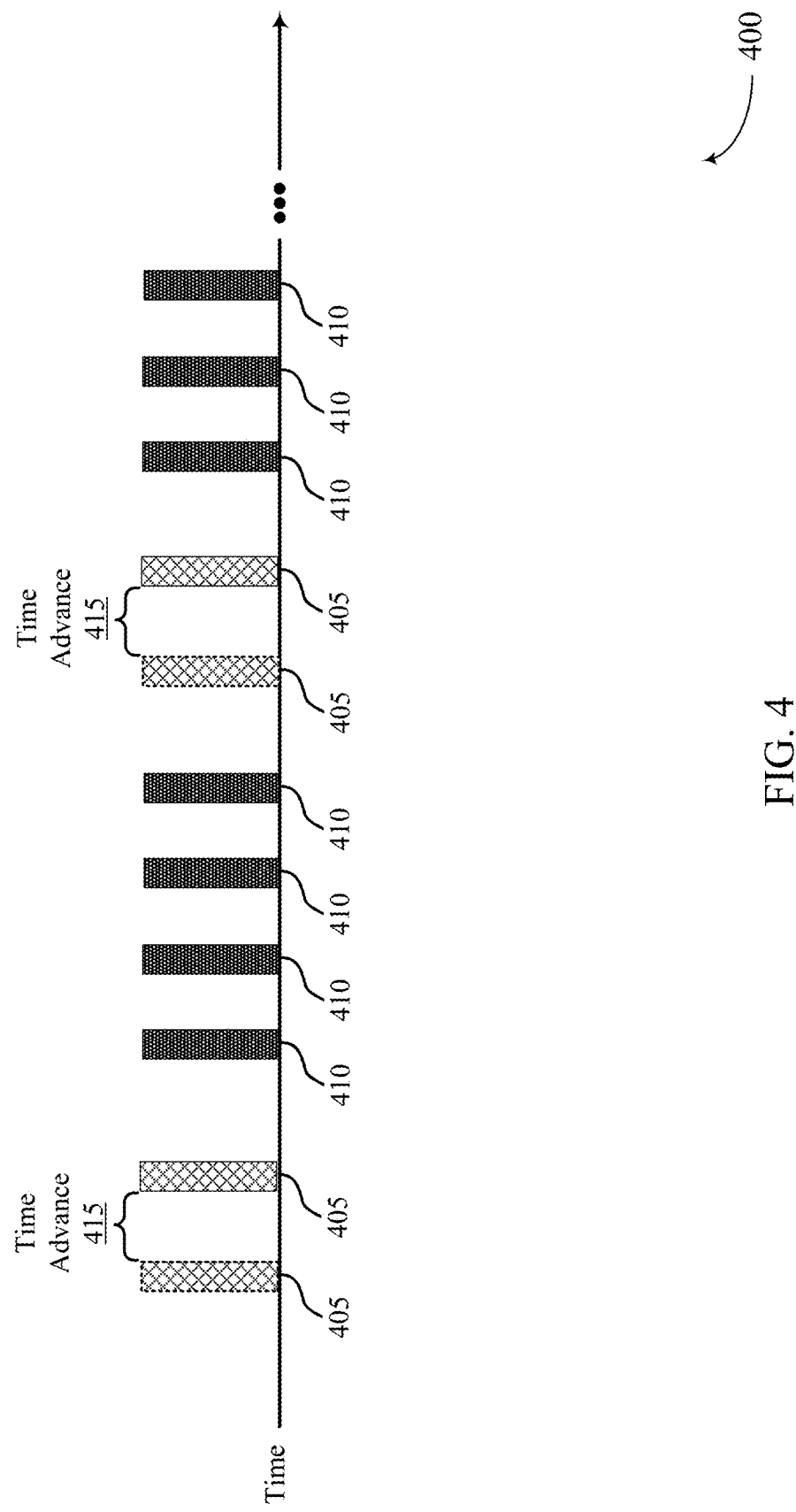
FIG. 4 shows an example of a timeline for frame transmissions that support performing frequency synchronization and phase correction in accordance with aspects of the present disclosure.

FIG. 4 shows an example of a timeline 400 for frame transmissions that support performing frequency synchronization and phase correction in accordance with aspects of the present disclosure. With reference to FIG. 1, in some cases the jitter in the split VR system 100 may be due to a size of an I-frame being bigger compared to a P-frame. I-frames may typically need more time in the split VR system 100 due to being larger in size compared to P-frames. To compensate for the size difference, I-frames may be rendered by the rendering device 115-*a* earlier so that they reach the display device 115-*b* at the same phase as P-frames. For example, the rendering device 115-*a* may render an I-frame 405 earlier based on a time advance 415, which may be system-defined or user-defined. In some examples the rendering device 115-*a* may identify a quantity of I-frames 405 and a quantity of P-frames 410. The rendering device 115-*a* may initiate rendering the I-frames at a first time, and initiate rendering the P-frames 410 at a second time after the first time. In some examples, the I-frame 405 may complete rendering at a same time as at least one of the P-frames 410. The rendering device 115 may then transmit the rendered I-frames 405 and the rendered P-frames 410 to the display device 115-*b*. As a result, the rendered I-frames 405 may reach the display device 115-*b* at a same phase as the P-frames 410. By advancing rendering of the I-frames 405, the jitter and/or variability seen by the display device 115-*b* in the split VR system 100 may be reduced or eliminated.

Figure 5:
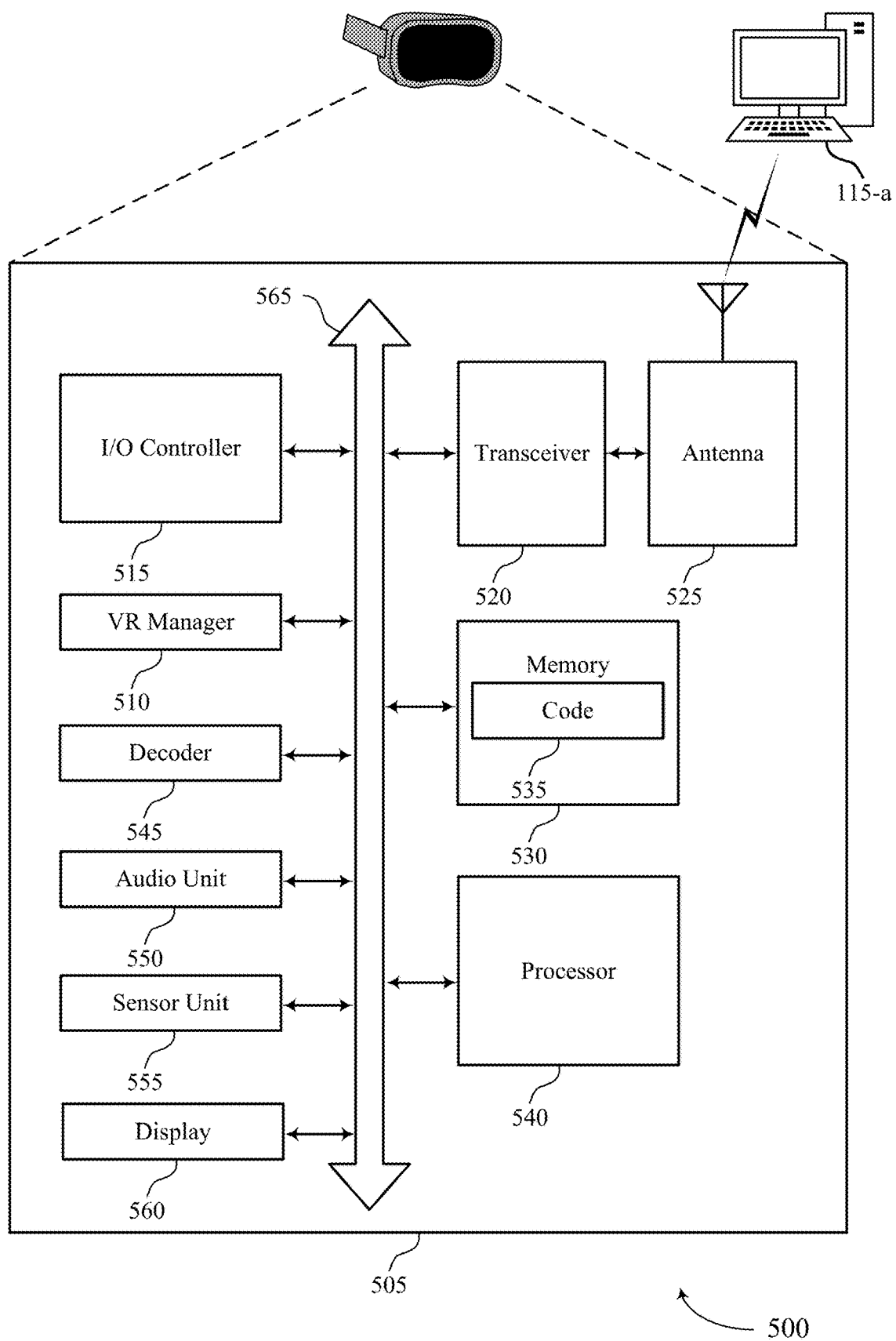
FIG. 5 shows a diagram of a system including a device that supports performing frequency synchronization and phase correction in accordance with aspects of the present disclosure.

FIG. 5 shows a diagram of a system 500 including a device 505 that supports performing frequency synchronization and phase correction in accordance with aspects of the present disclosure. The device 505 may be an example of or include the components of a display device (e.g., an HMD device) as described herein. The device 505 may include components for bi-directional voice and data communications including components for transmitting and receiving communications, including a VR manager 510, an I/O controller 515, a transceiver 520, an antenna 525, memory 530, a processor 540, a decoder 545, an audio unit 550, a sensor unit 555, and a display 560. These components may be in electronic communication via one or more buses (e.g., bus 565).

The VR manager 510 may monitor one or more frame repeats and a vertical sync count. In some examples, the one or more frame repeats may be associated with a vertical sync. The VR manager 510 may transmit a vertical sync count and an indication of one or more frame repeats to a rendering device (e.g., rendering device 115-*a*).

In some cases, the decoder 545 may receive and decode graphics resources, audio and/or video streams, and/or rendering instructions for displaying virtual reality content via the display 560. The audio unit 550 may broadcast audio signals related to a virtual reality environment. In some cases, the audio unit 550 may receive rendered audio signals from a rendering device (e.g., device 605). The sensor unit 555 may detect a direction of a head of a user wearing the device 505 using for example, a magnetic sensor, an angular velocity sensor, or an acceleration sensor, or a combination thereof. The display 560 may be a partially transmissive display device. The display 560 may be configured to be in front of a user's eyes, and thus the user can be immersed into a virtual reality environment. The detected direction of the head of the user may be used for changing a display image projected on the display 560, so as to follow the movement of the head of the user when the head moves. Because the device 505 and a rendering device (e.g., device 605) may be synchronized in frequency and phase, the user can experience a further enhanced sense of immersion into a virtual reality environment. In some examples, the display 560 may be a liquid crystal display (LCD), a cathode ray tube (CRT) display, and the like.

The I/O controller 515 may manage input and output signals for the device 505. The I/O controller 515 may also manage peripherals not integrated into the device 505. In some cases, the I/O controller 515 may represent a physical connection or port to an external peripheral. For example, I/O controller 515 may connect and communicate with a rendering device (e.g., rendering device 115-*a*). In some cases, the I/O controller 515 may utilize an operating system such as iOS®, ANDROID®, MS-DOS®, MS-WINDOWS®, OS/2®, UNIX®, LINUX®, or another known operating system. In other cases, the I/O controller 515 may represent or interact with a modem, a keyboard, a mouse, a touchscreen, or a similar device. In some cases, the I/O controller 515 may be implemented as part of a processor. In some cases, a user may interact with the device 505 via the I/O controller 515 or via hardware components controlled by the I/O controller 515.

The transceiver 520 may communicate bi-directionally, via one or more antennas, wired, or wireless links as described above. For example, the transceiver 520 may represent a wireless transceiver and may communicate bi-directionally with another wireless transceiver. The transceiver 520 may also include a modem to modulate the packets and provide the modulated packets to the antennas for transmission, and to demodulate packets received from the antennas. In some cases, the device 505 may include a single antenna 525. However, in some cases the device 505 may have more than one antenna 525, which may be capable of concurrently transmitting or receiving multiple wireless transmissions. For example, the device 505 may wirelessly receive one or more frames (e.g., P-frames, I-frames), graphics resources, audio and/or video streams, and/or rendered multimedia content (e.g., rendered audio and/or video streams (e.g., frames)) from a rendering device 115-*a*, or another computing device (e.g., another HMD device) via the antenna 525.

The memory 530 may include RAM and ROM. The memory 530 may store computer-readable, computer-executable code 535 including instructions that, when executed, cause the processor to perform various VR functions described herein. In some cases, the memory 530 may contain, among other things, a BIOS which may control basic hardware or software operation such as the interaction with peripheral components or devices.

The code 535 may include instructions to implement aspects of the present disclosure, including instructions to support frequency synchronization and phase correction. The code 535 may be stored in a non-transitory computer-readable medium such as system memory or other type of memory. In some cases, the code 535 may not be directly executable by the processor 540 but may cause a computer (e.g., when compiled and executed) to perform functions described herein.

The processor 540 may include an intelligent hardware device, (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 540 may be configured to operate a memory array using a memory controller. In other cases, a memory controller may be integrated into the processor 540. The processor 540 may be configured to execute computer-readable instructions stored in a memory (e.g., the memory 530) to cause the device 505 to perform various functions (e.g., functions or tasks supporting various VR functions such as frequency synchronization and phase correction, monitoring one or more frame repeats and a vertical sync count). In some cases, the VR manager 510 may be part of the processor 540.

As detailed above, VR manager 510 and/or one or more components of the VR manager 510 may perform and/or be a means for performing, either alone or in combination with other elements, one or more operations for performing frequency synchronization and phase correction.

Figure 6:
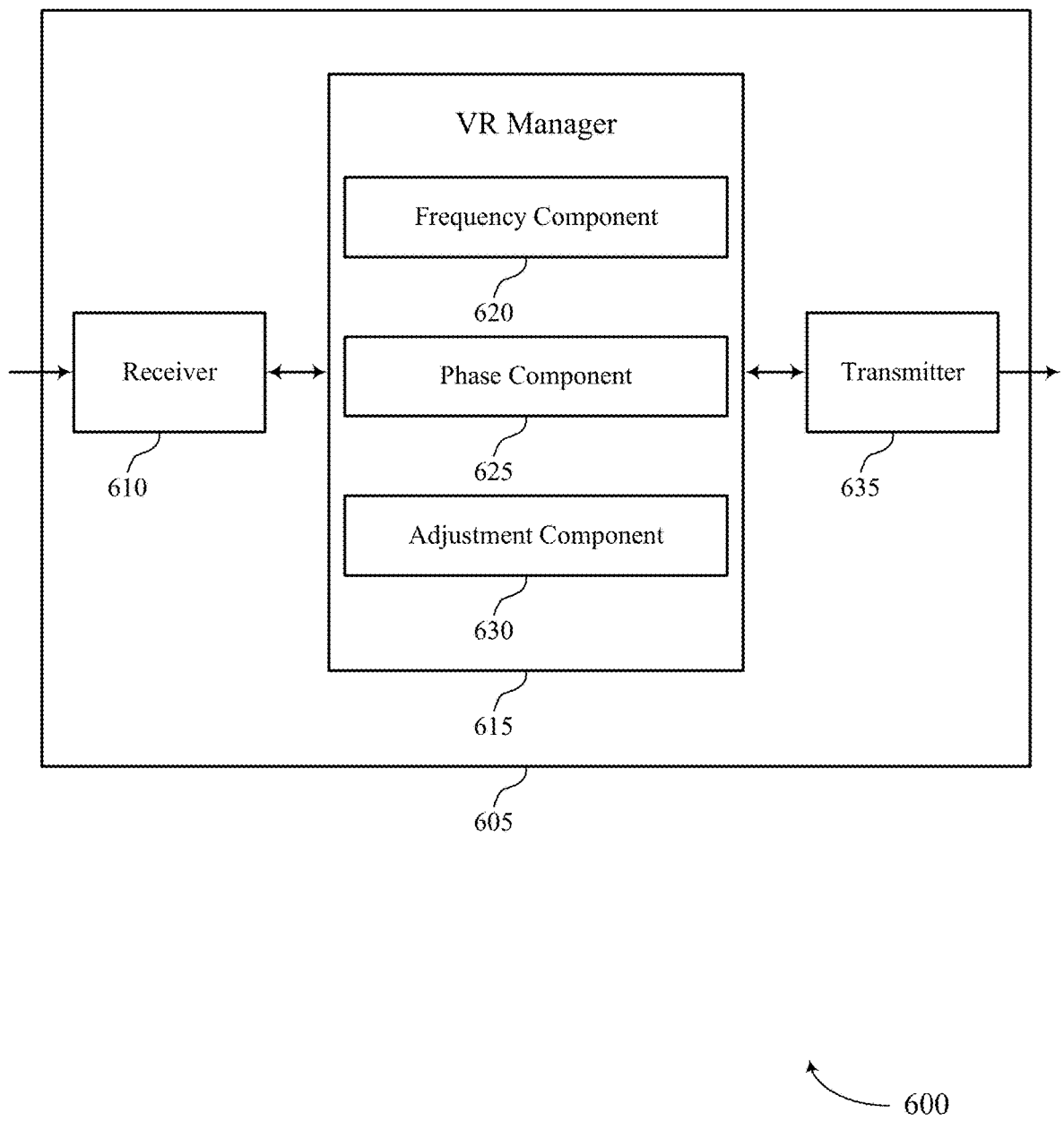
FIGS. 6 and 7 show block diagrams of a device that supports performing frequency synchronization and phase correction in accordance with aspects of the present disclosure.

FIG. 6 shows a block diagram 600 of a device 605 that supports performing frequency synchronization and phase correction in accordance with aspects of the present disclosure. The device 605 may be an example of aspects of a rendering device as described herein. The device 605 may include a receiver 610, a VR manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to VR information such as a vertical sync count and a frame repeat statistics report including an indication of one or more frame repeats, etc.). For example, the receiver 610 may receive, from a display device, a vertical sync count and an indication of one or more frame repeats. Information may be passed on to other components of the device 605. The receiver 610 may be an example of aspects of the transceiver 820 described with reference to FIG. 8. The receiver 610 may utilize a single antenna or a set of antennas.

The VR manager 615, or its sub-components, may be implemented in hardware, code (e.g., software or firmware) executed by a processor, or any combination thereof. If implemented in code executed by a processor, the functions of the VR manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The VR manager 615, or its sub-components, may be physically located at various positions, including being distributed such that portions of functions are implemented at different physical locations by one or more physical components. In some examples, the VR manager 615, or its sub-components, may be a separate and distinct component in accordance with various aspects of the present disclosure. In some examples, the VR manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The VR manager 615 may include a frequency component 620, a phase component 625, and an adjustment component 630. The frequency component 620 may estimate a vertical sync frequency based at least in part on the received vertical sync count. The phase component 625 may determine a phase corresponding to a minimum frame repeat based at least in part on the indication of the one or more frame repeats. The adjustment component 630 may adjust a vertical sync frequency of the rendering device to the estimated vertical sync frequency and a phase of the rendering device to the determined phase.

The transmitter 635 may transmit signals generated by other components of the device 605. For example, the transmitter 635 may transmit one or more frames to the display device using the adjusted frequency and the adjusted phase. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
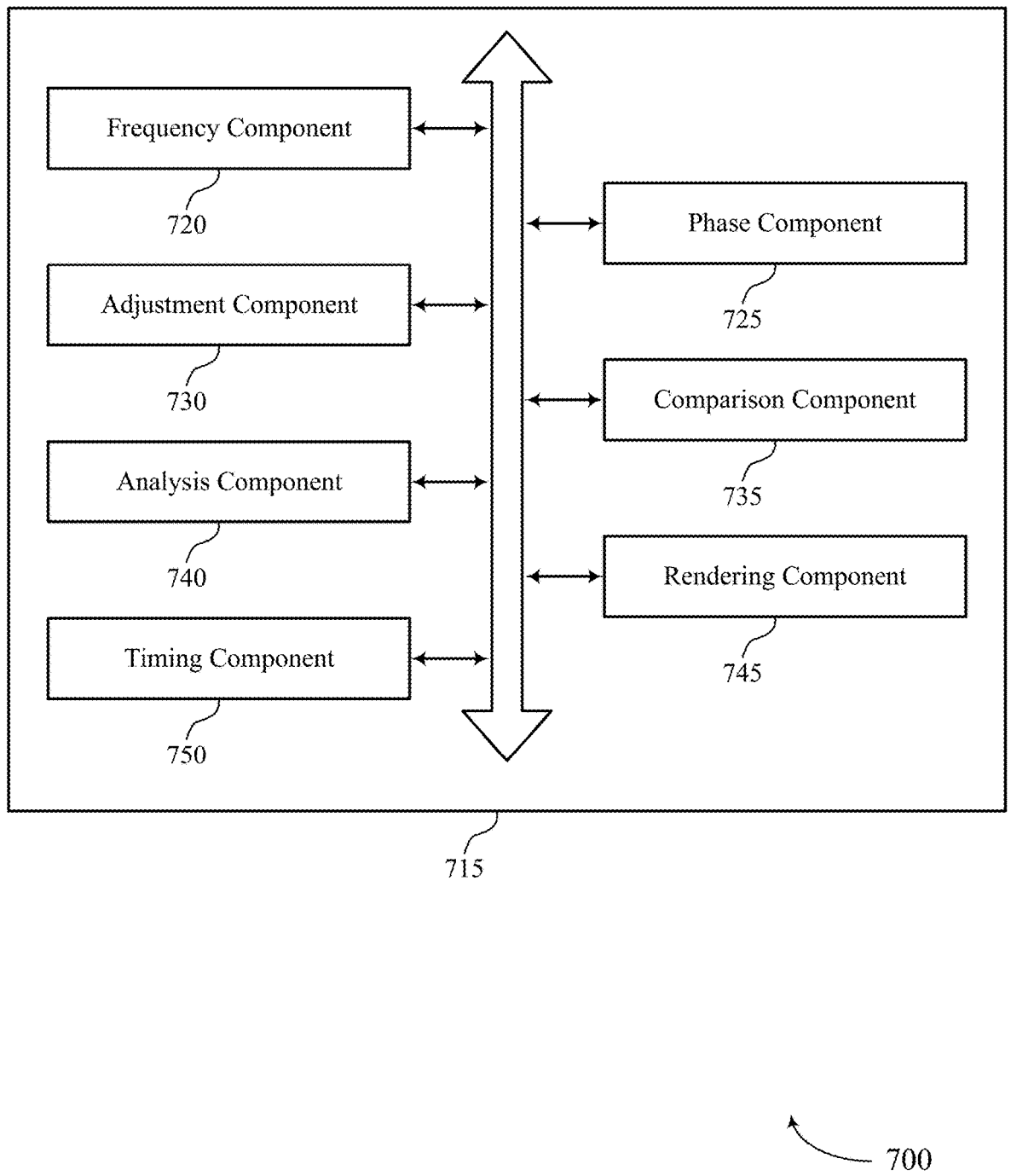

FIG. 7 shows a block diagram 700 of a device including a VR manager 715 that supports performing frequency synchronization and phase correction in accordance with aspects of the present disclosure. The VR manager 715 may be an example of aspects of a VR manager 615 or a VR manager 810 described herein. The VR manager 715 may include a frequency component 720, a phase component 725, an adjustment component 730, a comparison component 735, an analysis component 740, a rendering component 745, and a timing component 750. Each of these components may be in communication with one another (e.g., via one or more buses).

The frequency component 720 may estimate a vertical sync frequency based at least in part on a received vertical sync count from a display device. The phase component 725 may determine a phase corresponding to a minimum frame repeat based at least in part on an indication of one or more frame repeats. The adjustment component 730 may adjust a vertical sync frequency of the device to the estimated vertical sync frequency and a phase of the device to the determined phase.

The comparison component 735 may compare the vertical sync count and a preceding vertical sync count received from the display device over a time interval. In some examples, estimating the vertical sync frequency may be based at least in part on the comparison. The comparison component 735 may compare a quantity of frame repeats occurring within a time interval to a quantity of frame repeats occurring within a previous time interval. The comparison component 735 may determine a vertical sync count difference between the vertical sync count and a preceding vertical sync count received from the display device. In some examples, the vertical sync count and the preceding vertical sync count are received during a time interval. The comparison component 735 may determine a quotient of the vertical sync count difference and the time interval. In some examples, the quotient includes the estimated vertical sync frequency.

The analysis component 740 may determine a quantity of frame repeats occurring within a time interval based at least in part on the indication, and determine the minimum frame repeat based at least in part on the quantity of frame repeats occurring within the time interval. The analysis component 740 may identify a phase corresponding to the determined minimum frame repeat.

The analysis component 740 may compare the quantity of frame repeats, one or more vertical syncs, or a frame frequency, or a combination thereof. In some examples, determining the minimum frame repeat and identifying the phase corresponding to the minimum frame repeat may be based at least in part on the comparing. The analysis component 740 may generate a phase model representing a relationship between the quantity of frame repeats, one or more vertical syncs, or a frame frequency, or a combination thereof. The analysis component 740 may determine the minimum frame repeat using the phase model based at least in part on iterating across the phase model, and identify a phase corresponding to the determined minimum frame repeat using the phase model. In some cases, the analysis component 740 may select a step size from a set of step sizes for comparing values across the phase model, determine a direction for comparing values across the phase model based at least in part on the quantity of frame repeats occurring within the time interval, and iterate across the phase model using the selected step size and in the determined direction.

The analysis component 740 may determine that the quantity of frame repeats occurring within the time interval are below a threshold, and reduce an ATW by shifting the identified phase closer to a vertical sync node of the phase model based at least in part on the quantity of frame repeats occurring within the time interval being below the threshold. The analysis component 740 may determine a timing of at least two vertical sync counts, wherein determining the phase corresponding to the minimum frame repeat is performed during a time interval corresponding to the at least two vertical sync counts.

The rendering component 745 may identify a quantity of P-frames and a quantity of I-frames. In some examples, the one or more frames include at least one of the P-frames and at least one of the I-frames. The rendering component 745 may initiate rendering the I-frames at a first time, and initiate rendering the P-frames at a second time after the first time.

The timing component 750 may set a duration of an ATW based at least in part on the adjusted vertical sync frequency of the rendering device. In some examples, a duration of an ATW is based at least in part on the one or more frames arriving at the display device before or after a vertical sync. The timing component 750 may determine a timing of the one or more frames arriving at the display device, and determine whether the one or more frames arrived at the display device before or after a vertical sync based at least in part on the timing.

Figure 8:
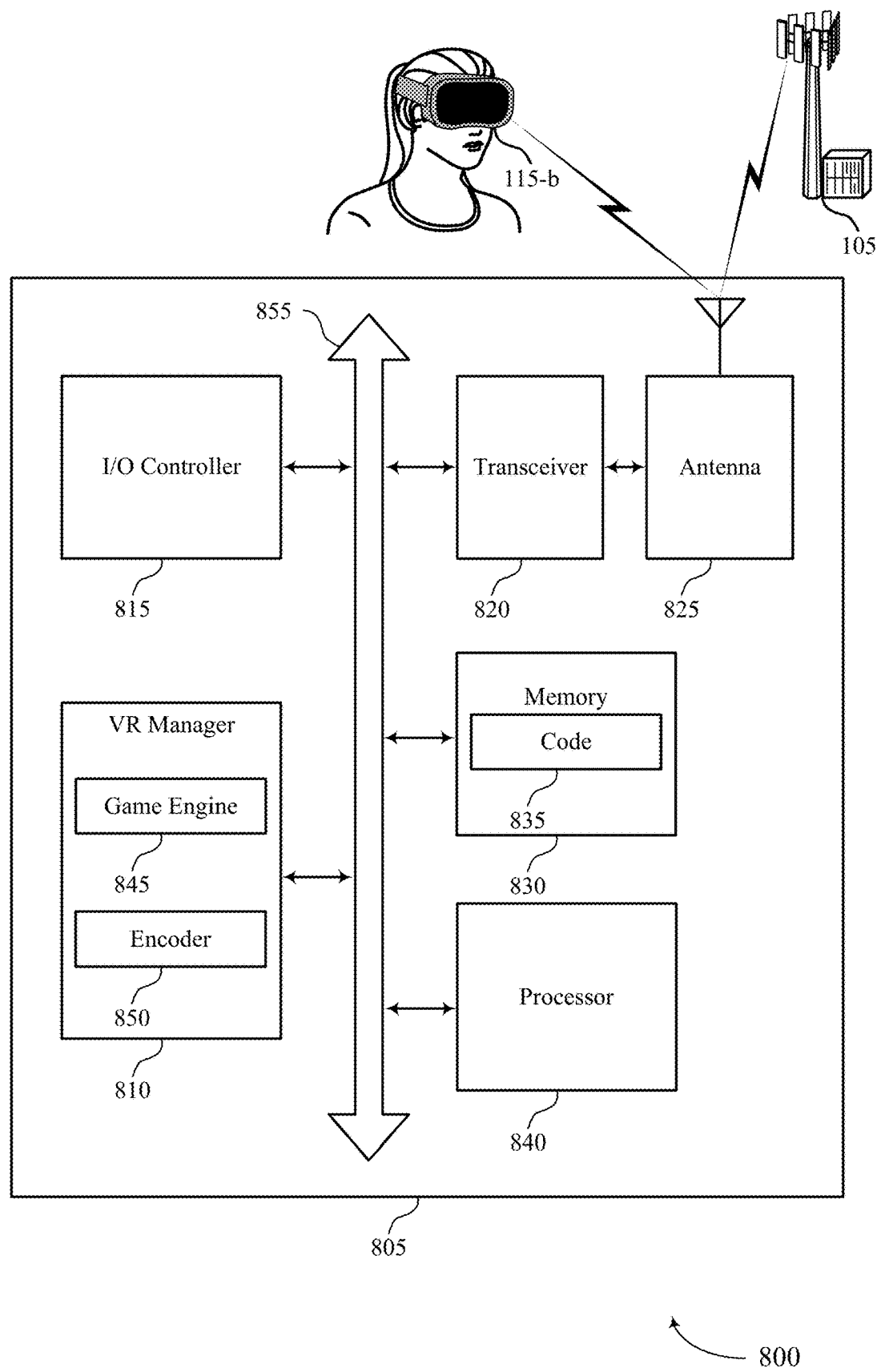
FIG. 8 shows a diagram of a system including a device that supports performing frequency synchronization and phase correction in accordance with aspects of the present disclosure.

FIG. 8 shows a diagram of a system 800 including a device 805 that supports performing frequency synchronization and phase correction in accordance with aspects of the present disclosure. The device 805 may be an example of or include the components of a rendering device as described herein. The device 805 may include components for bi-directional voice and data communications including components for transmitting and receiving communications, including a VR manager 810, an I/O controller 815, a transceiver 820, an antenna 825, memory 830, and a processor 840. These components may be in electronic communication via one or more buses (e.g., bus 855).

The device 805 may be a rendering device as described herein. The term "rendering device" may be used herein to describe a device (e.g., a personal computing device, a desktop, a laptop, mobile computing device, and the like) that may render one or more frames (e.g., P-frames, I-frames), graphics resources, audio and/or video streams, and/or rendered multimedia content (e.g., rendered audio and/or video streams (e.g., frames)) for a VR environment. In some examples, the device 805 may render instructions and/or other features of the graphics resources, audio and/or video streams, and/or rendering instructions to be displayed by a respective display device (e.g., HMD device).

The VR manager 810 may receive, from a display device, a vertical sync count and an indication of one or more frame repeats, estimate a vertical sync frequency based at least in part on the received vertical sync count, determine a phase corresponding to a minimum frame repeat based at least in part on the indication of the one or more frame repeats, adjust a vertical sync frequency of the device 805 to the estimated vertical sync frequency and a phase of the device 805 to the determined phase, and transmit one or more frames to the display device using the adjusted frequency and the adjusted phase.

The I/O controller 815 may manage input and output signals for the device 805. The I/O controller 815 may also manage peripherals not integrated into the device 805. In some cases, the I/O controller 815 may represent a physical connection or port to an external peripheral. For example, I/O controller 815 may connect and manage a display device (e.g., display device 115-b). In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the device 805 may include a single antenna 825. However, in some cases the device 805 may have more than one antenna 825, which may be capable of concurrently transmitting or receiving multiple wireless transmissions. For example, the device 805 may wirelessly communicate one or more frames (e.g., P-frames, I-frames), graphics resources, audio and/or video streams, and/or rendered multimedia content (e.g., rendered audio and/or video streams (e.g., frames)) with display device 115-b and/or base station 105, or another computing device (e.g., a beacon, a smartphone, a tablet) via the antenna 825.

The memory 830 may include RAM and ROM. The memory 830 may store computer-readable, computer-executable code 835 including instructions that, when executed, cause the processor to perform various VR functions described herein. In some cases, the memory 830 may contain, among other things, a BIOS which may control basic hardware or software operation such as the interaction with peripheral components or devices.

The code 835 may include instructions to implement aspects of the present disclosure, including instructions to support frequency synchronization and phase correction. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

The processor 840 may include an intelligent hardware device, (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting various VR functions such as frequency synchronization and phase correction). In some cases, the VR manager 810 may be part of the processor 840.

The VR manager may also include a game engine 845 and an encoder 850. The game engine 845 may support a platform for one or more VR applications (e.g., entertainment application, gaming application, business application). The game engine 845 may support rendering elements that manages creation of 2-D or 3-D graphics. For example, in VR applications frames may be rendered at high speed to create realistic movement. The actual rendering may include a series of computations that the game engine 845 performs to create images based on 2D or 3D models, so that it can accurately and efficiently generate objects and character position on a display screen of a display device (e.g., HMD). The game engine 845 may also manage movement and interaction among characters and objects in a VR environment. For example, the game engine 845 may receive a signal from a motion sensor of the display device indicating a position or a translational motion of a person associated with the display device. The game engine 845 may also manage rendering video and/or audio for a display device without causing other components of the VR environment, such as graphics or audio rendering, to lag. The encoder 850 may be configured to receive and convert frames (e.g., P-frames, I-frames), graphics resources, audio and/or video streams, and/or rendered multimedia content (e.g., rendered audio and/or video streams (e.g., frames)) into packets for transmission to a display device.

As detailed above, VR manager 810 and/or one or more components of the VR manager 810 may perform and/or be a means for performing, either alone or in combination with other elements, one or more operations for performing frequency synchronization and phase correction.

Figure 9:
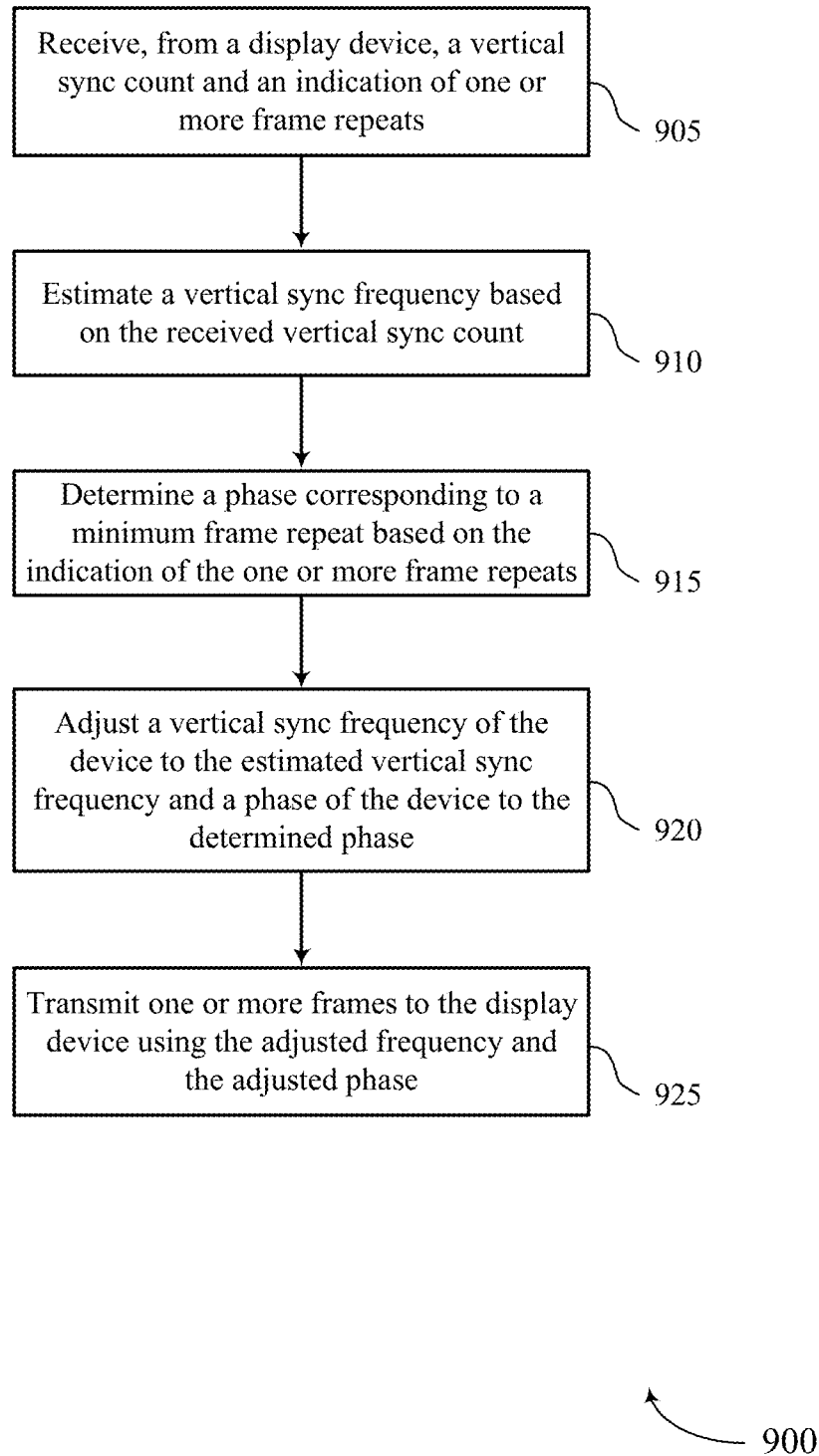
FIGS. 9 through 12 show flowcharts illustrating methods that support performing frequency synchronization and phase correction in accordance with aspects of the present disclosure.

FIG. 9 shows a flowchart illustrating a method 900 that supports performing frequency synchronization and phase correction in accordance with aspects of the present disclosure. The operations of method 900 may be implemented by a rendering device 115-*a* or its components as described herein. Alternatively, the operations of method 900 may be implemented by a display device 115-*b* or its components as described herein. The operations of method 900 may be performed by a VR manager as described with reference to FIGS. 6 to 8. In some examples, a rendering device 115-*a* may execute a set of instructions to control the functional elements of the rendering device 115-*a* to perform the functions described below. Additionally or alternatively, a rendering device 115-*a* may perform aspects of the functions described below using special-purpose hardware.

At 905, the rendering device 115-*a* may receive, from a display device (e.g., display device 115-*b*), a vertical sync count and an indication of one or more frame repeats. The operations of 905 may be performed according to the methods described herein. In certain examples, aspects of the operations of 905 may be performed by a receiver as described with reference to FIG. 6 or a transceiver as described with reference to FIG. 8.

At 910, the rendering device 115-*a* may estimate a vertical sync frequency based on the received vertical sync count. The operations of 910 may be performed according to the methods described herein. In certain examples, aspects of the operations of 910 may be performed by a frequency component as described with reference to FIGS. 6 and 7.

At 915, the rendering device 115-*a* may determine a phase corresponding to a minimum frame repeat based on the indication of the one or more frame repeats. The operations of 915 may be performed according to the methods described herein. In certain examples, aspects of the operations of 915 may be performed by a phase component as described with reference to FIGS. 6 and 7.

At 920, the rendering device 115-*a* may adjust a vertical sync frequency of the rendering device 115-*a* to the estimated vertical sync frequency and a phase of the rendering device 115-*a* to the identified phase. The operations of 920 may be performed according to the methods described herein. In certain examples, aspects of the operations of 920 may be performed by an adjustment component as described with reference to FIGS. 6 and 7.

At 925, the rendering device 115-*a* may transmit one or more frames to the display device (e.g., display device 115-*b*) using the adjusted frequency and the adjusted phase. The operations of 925 may be performed according to the methods described herein. In certain examples, aspects of the operations of 925 may be performed by a transmitter as described with reference to FIG. 6 or a transceiver as described with reference to FIG. 8.

Figure 10:
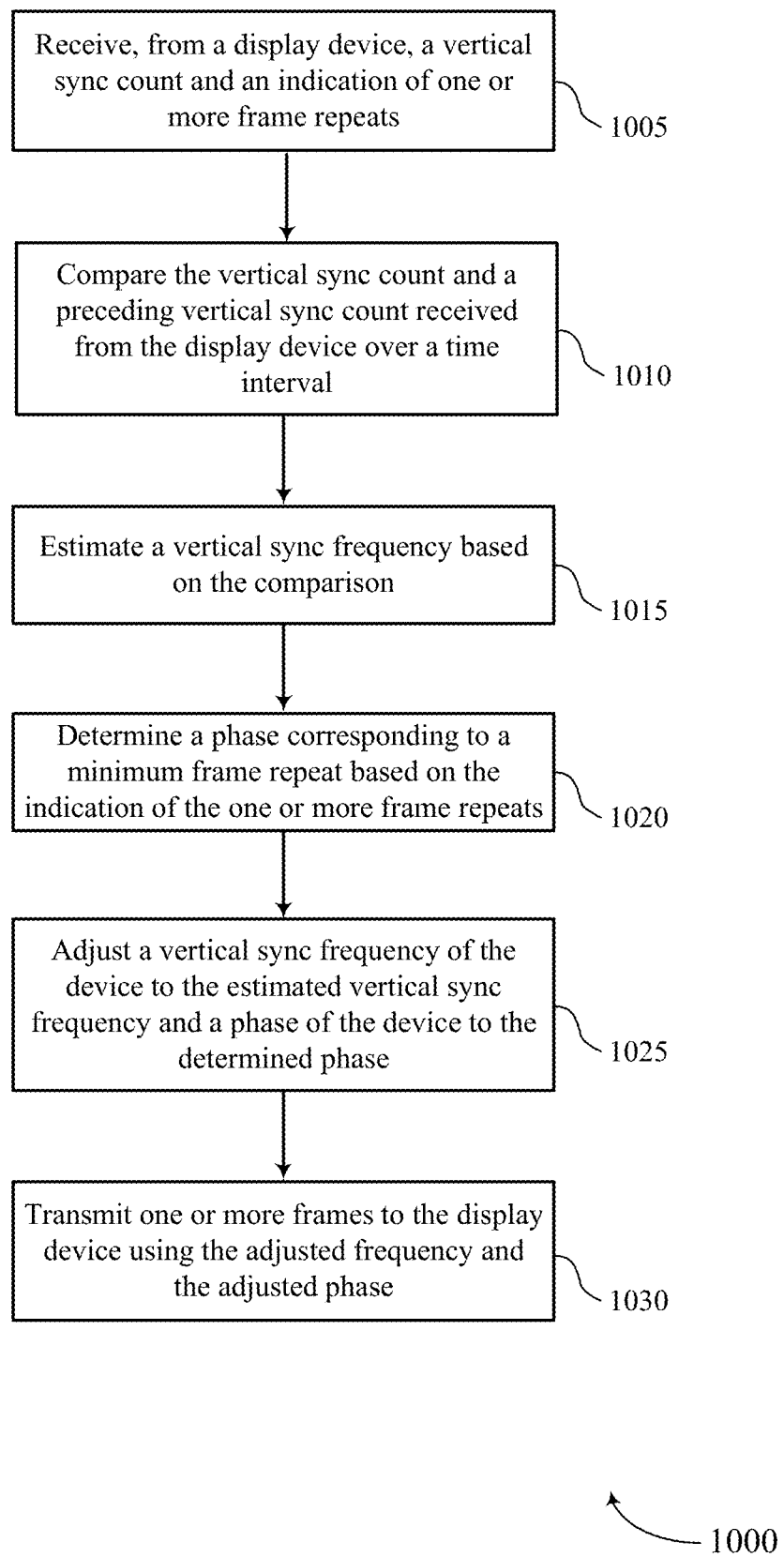

FIG. 10 shows a flowchart illustrating a method 1000 that supports performing frequency synchronization and phase correction in accordance with aspects of the present disclosure. The operations of method 1000 may be implemented by a rendering device 115-*a* or its components as described herein. Alternatively, the operations of method 900 may be implemented by a display device 115-*b* or its components as described herein. The operations of method 1000 may be performed by a VR manager as described with reference to FIGS. 6 to 8. In some examples, a rendering device 115-*a* may execute a set of instructions to control the functional elements of the rendering device 115-*a* to perform the functions described below. Additionally or alternatively, a rendering device 115-*a* may perform aspects of the functions described below using special-purpose hardware.

At 1005, the rendering device 115-*a* may receive, from a display device (e.g., display device 115-*b*), a vertical sync count and an indication of one or more frame repeats. The operations of 1005 may be performed according to the methods described herein. In certain examples, aspects of the operations of 1005 may be performed by a receiver as described with reference to FIG. 6 or a transceiver as described with reference to FIG. 8.

At 1010, the rendering device 115-*a* may compare the vertical sync count and a preceding vertical sync count received from the display device (e.g., display device 115-*b*) over a time interval. The operations of 1010 may be performed according to the methods described herein. In certain examples, aspects of the operations of 1010 may be performed by a comparison component as described with reference to FIG. 7.

At 1015, the rendering device 115-*a* may estimate a vertical sync frequency based on the comparison. The operations of 1015 may be performed according to the methods described herein. In certain examples, aspects of the operations of 1015 may be performed by a frequency component as described with reference to FIGS. 6 and 7.

At 1020, the rendering device 115-*a* may determine a phase corresponding to a minimum frame repeat based on the indication of the one or more frame repeats. The operations of 1020 may be performed according to the methods described herein. In certain examples, aspects of the operations of 1020 may be performed by a phase component as described with reference to FIGS. 6 and 7.

At 1025, the rendering device 115-*a* may adjust a vertical sync frequency of the device 115-*a* to the estimated vertical sync frequency and a phase of the device 115-*a* to the identified phase. The operations of 1025 may be performed according to the methods described herein. In certain examples, aspects of the operations of 1025 may be performed by an adjustment component as described with reference to FIGS. 6 and 7.

At 1030, the rendering device 115-a may transmit one or more frames to the display device (e.g., device 115-b) using the adjusted frequency and the adjusted phase. The operations of 1030 may be performed according to the methods described herein. In certain examples, aspects of the operations of 1030 may be performed by a transmitter as described with reference to FIG. 6 or a transceiver as described with reference to FIG. 8.

Figure 11:
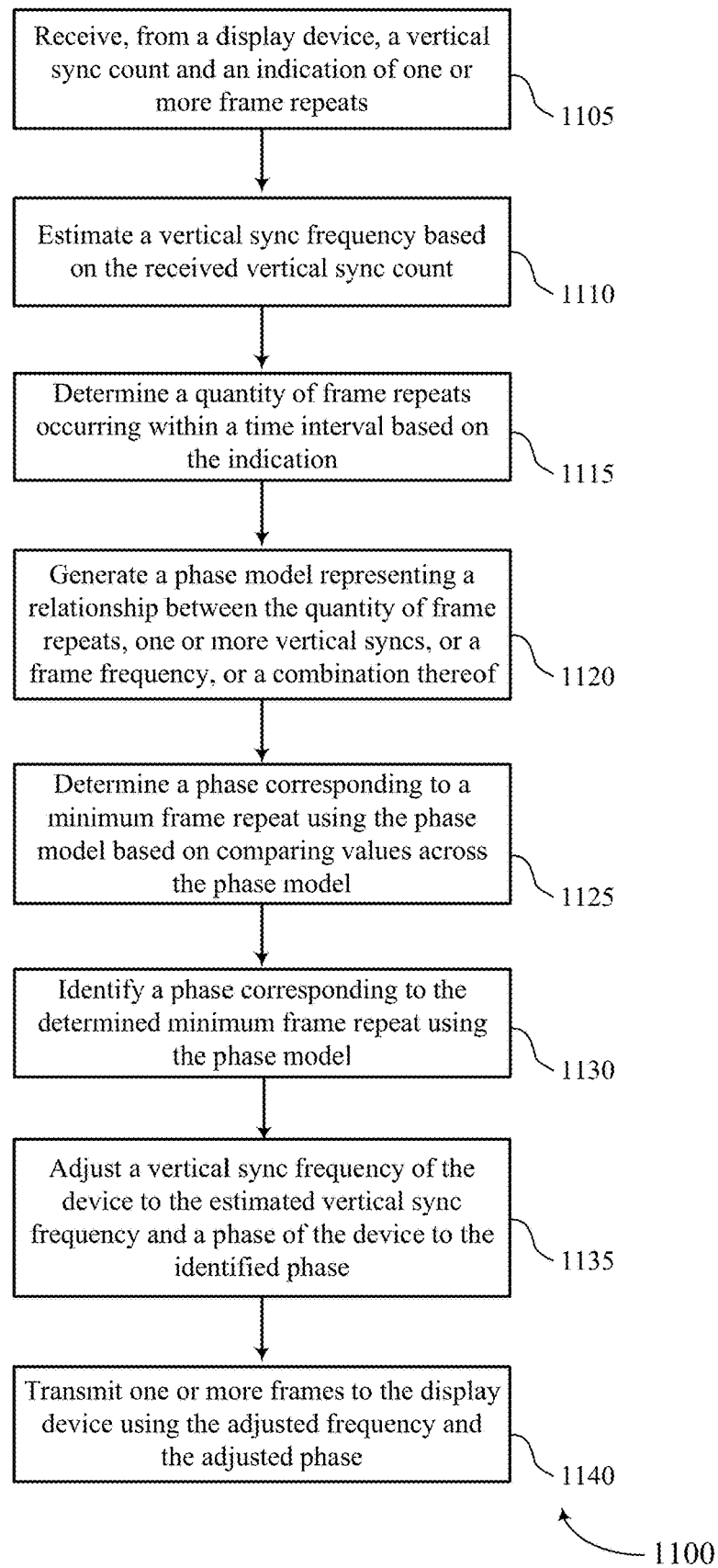

FIG. 11 shows a flowchart illustrating a method 1100 that supports performing frequency synchronization and phase correction in accordance with aspects of the present disclosure. The operations of method 1100 may be implemented by a rendering device 115-a or its components as described herein. Alternatively, the operations of method 900 may be implemented by a display device 115-b or its components as described herein. The operations of method 1100 may be performed by a VR manager as described with reference to FIGS. 6 to 8. In some examples, a rendering device 115-a may execute a set of instructions to control the functional elements of the rendering device 115-a to perform the functions described below. Additionally or alternatively, a rendering device 115-a may perform aspects of the functions described below using special-purpose hardware.

At 1105, the rendering device 115-a may receive, from a display device (e.g., display device 115-b), a vertical sync count and an indication of one or more frame repeats. The operations of 1105 may be performed according to the methods described herein. In certain examples, aspects of the operations of 1105 may be performed by a receiver as described with reference to FIG. 6 or a transceiver as described with reference to FIG. 8.

At 1110, the rendering device 115-a may estimate a vertical sync frequency based on the received vertical sync count. The operations of 1110 may be performed according to the methods described herein. In certain examples, aspects of the operations of 1110 may be performed by a frequency component as described with reference to FIGS. 6 and 7.

At 1115, the rendering device 115-a may determine a quantity of frame repeats occurring within a time interval based on the indication. The operations of 1115 may be performed according to the methods described herein. In certain examples, aspects of the operations of 1115 may be performed by an analysis component as described with reference to FIG. 7.

At 1120, the rendering device 115-a may generate a phase model representing a relationship between the quantity of frame repeats, one or more vertical syncs, or a frame frequency, or a combination thereof. The operations of 1120 may be performed according to the methods described herein. In certain examples, aspects of the operations of 1120 may be performed by an analysis component as described with reference to FIG. 7.

At 1125, the rendering device 115-a may determine a phase corresponding to a minimum frame repeat based using the phase model based on comparing values across the phase model. The operations of 1125 may be performed according to the methods described herein. In certain examples, aspects of the operations of 1125 may be performed by an analysis component as described with reference to FIG. 7.

At 1130, the rendering device 115-a may identify a phase corresponding to the determined minimum frame repeat using the phase model. The operations of 1130 may be performed according to the methods described herein. In certain examples, aspects of the operations of 1130 may be performed by an analysis component as described with reference to FIG. 7

At 1135, the rendering device 115-a may adjust a vertical sync frequency of the rendering device 115-a to the estimated vertical sync frequency and a phase of the rendering device 115-a to the identified phase. The operations of 1135 may be performed according to the methods described herein. In certain examples, aspects of the operations of 1135 may be performed by an adjustment component as described with reference to FIGS. 6 and 7.

At 1140, the rendering device 115-a may transmit one or more frames to the display device (e.g., display device 115-b) using the adjusted frequency and the adjusted phase. The operations of 1140 may be performed according to the methods described herein. In certain examples, aspects of the operations of 1140 may be performed by a transmitter as described with reference to FIG. 6 or a transceiver as described with reference to FIG. 8.

Figure 12:
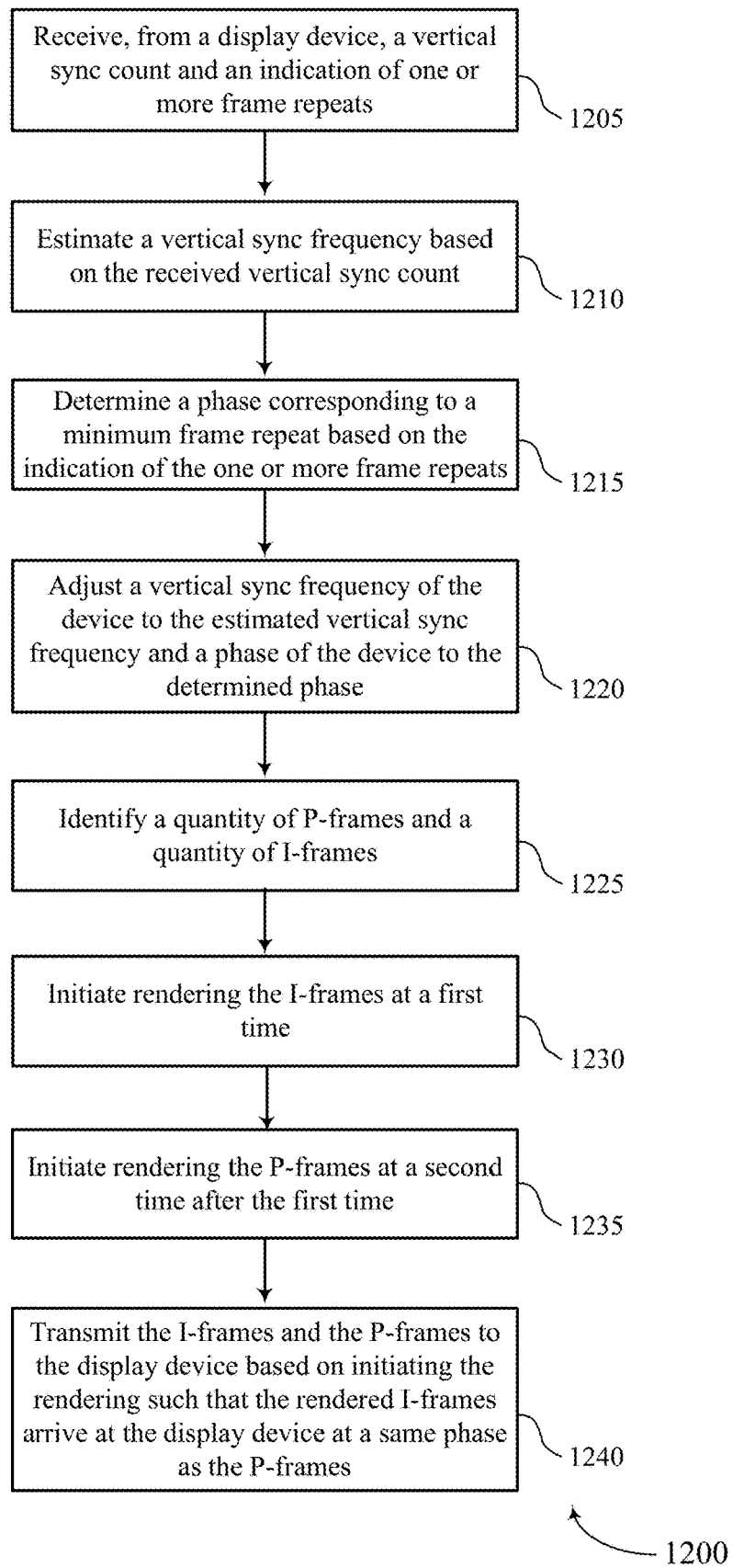

FIG. 12 shows a flowchart illustrating a method 1200 that supports performing frequency synchronization and phase correction in accordance with aspects of the present disclosure. The operations of method 1200 may be implemented by a rendering device 115-a or its components as described herein. Alternatively, the operations of method 900 may be implemented by a display device 115-b or its components as described herein. The operations of method 1200 may be performed by a VR manager as described with reference to FIGS. 6 to 8. In some examples, a rendering device 115-a may execute a set of instructions to control the functional elements of the rendering device 115-a to perform the functions described below. Additionally or alternatively, a rendering device 115-a may perform aspects of the functions described below using special-purpose hardware.

At 1205, the rendering device 115-a may receive, from a display device (e.g., display device 115-b), a vertical sync count and an indication of one or more frame repeats. The operations of 1205 may be performed according to the methods described herein. In certain examples, aspects of the operations of 1205 may be performed by a receiver as described with reference to FIG. 6 or a transceiver as described with reference to FIG. 8.

At 1210, the rendering device 115-a may estimate a vertical sync frequency based on the received vertical sync count. The operations of 1210 may be performed according to the methods described herein. In certain examples, aspects of the operations of 1210 may be performed by a frequency component as described with reference to FIGS. 6 and 7.

At 1215, the rendering device 115-a may determine a phase corresponding to a minimum frame repeat based on the indication of the one or more frame repeats. The operations of 1215 may be performed according to the methods described herein. In certain examples, aspects of the operations of 1215 may be performed by a phase component as described with reference to FIGS. 6 and 7.

At 1220, the rendering device 115-a may adjust a vertical sync frequency of the rendering device 115-a to the estimated vertical sync frequency and a phase of the rendering device 115-b to the determined phase. The operations of 1220 may be performed according to the methods described herein. In certain examples, aspects of the operations of 1220 may be performed by an adjustment component as described with reference to FIGS. 6 and 7.

At 1225, the rendering device 115-a may identify a quantity of P-frames and a quantity of I-frames. The operations of 1225 may be performed according to the methods described herein. In certain examples, aspects of the operations of 1225 may be performed by a rendering component as described with reference to FIG. 7.

At 1230, the rendering device 115-*a* may initiate rendering the I-frames at a first time. The operations of 1230 may be performed according to the methods described herein. In certain examples, aspects of the operations of 1230 may be performed by a rendering component as described with reference to FIG. 7.

At 1235, the rendering device 115-*a* may initiate rendering the P-frames at a second time after the first time. The operations of 1235 may be performed according to the methods described herein. In certain examples, aspects of the operations of 1235 may be performed by a rendering component as described with reference to FIG. 7.

At 1240, the rendering device 115-*a* may transmit the I-frames and the P-frames to the display device (e.g., display device 115-*b*) based on initiating the rendering such that the rendered I-frames arrive at the display device at a same phase as the P-frames. The operations of 1240 may be performed according to the methods described herein. In certain examples, aspects of the operations of 1240 may be performed by a transmitter as described with reference to FIG. 6 or a transceiver as described with reference to FIG. 8.

It should be noted that the methods described above describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for performing frequency synchronization and phase correction at a rendering device, comprising:
   receiving, from a display device, a vertical sync count and an indication of one or more frame repeats;
   estimating a vertical sync frequency based at least in part on the received vertical sync count;
   determining a phase corresponding to a minimum frame repeat based at least in part on the indication of the one or more frame repeats;
   adjusting a vertical sync frequency of the rendering device to the estimated vertical sync frequency and a phase of the rendering device to the determined phase; and
   transmitting one or more frames to the display device using the adjusted frequency and the adjusted phase.

2. The method of claim 1, further comprising:
   comparing the vertical sync count and a preceding vertical sync count received from the display device over a time interval, wherein estimating the vertical sync frequency is further based at least in part on the comparing.

3. The method of claim 1, further comprising:
   identifying a quantity of predicted frames (P-frames) and a quantity of intra-frames (I-frames), wherein the one or more frames comprise at least one of the P-frames and at least one of the I-frames;
   initiating rendering the I-frames at a first time;
   initiating rendering the P-frames at a second time after the first time; and
   transmitting the I-frames and the P-frames to the display device based at least in part on initiating the rendering such that the rendered I-frames arrive at the display device at a same phase as the P-frames.

4. The method of claim 1, further comprising:
   determining a quantity of frame repeats occurring within a time interval based at least in part on the indication;
   determining the minimum frame repeat based at least in part on the quantity of frame repeats occurring within the time interval; and
   identifying a phase corresponding to the determined minimum frame repeat.

5. The method of claim 4, further comprising:
   comparing the quantity of frame repeats, one or more vertical syncs, or a frame frequency, or a combination thereof, wherein determining the minimum frame repeat and identifying the phase corresponding to the minimum frame repeat is further based at least in part on the comparison.

6. The method of claim 4, further comprising:
   generating a phase model representing a relationship between the quantity of frame repeats, one or more vertical syncs, or a frame frequency, or a combination thereof.

7. The method of claim 6, wherein determining the phase corresponding to the minimum frame repeat further comprises:
   determining the minimum frame repeat using the phase model based at least in part on comparing values across the phase model; and
   identifying a phase corresponding to the determined minimum frame repeat using the phase model.

8. The method of claim 7, wherein comparing values across the phase model further comprises:
   selecting a step size from a set of step sizes for comparing values across the phase model;
   determining a direction for comparing values across the phase model based at least in part on the quantity of frame repeats occurring within the time interval; and
   iterating across the phase model using the selected step size and in the determined direction.

9. The method of claim 8, wherein determining the direction further comprises:
   comparing the quantity of frame repeats occurring within the time interval to a second quantity of frame repeats occurring within a previous time interval.

10. The method of claim 9, further comprising:
    determining that the quantity of frame repeats occurring within the time interval are below a threshold; and
    reducing an asynchronous time warp (ATW) by shifting the identified phase closer to a vertical sync node of the phase model based at least in part on the quantity of frame repeats occurring within the time interval being below the threshold.

11. The method of claim 1, wherein estimating the vertical sync frequency further comprises:
    determining a vertical sync count difference between the vertical sync count and a preceding vertical sync count received from the display device, wherein the vertical sync count and the preceding vertical sync count are received during a time interval; and
    determining a quotient of the vertical sync count difference and the time interval, wherein the quotient comprises the estimated vertical sync frequency.

12. The method of claim 1, further comprising:
    determining a timing of at least two vertical sync counts, wherein determining the phase corresponding to the minimum frame repeat is performed during a time interval corresponding to the at least two vertical sync counts.

13. The method of claim 1, further comprising:
    setting a duration of an asynchronous time warp (ATW) based at least in part on the adjusted vertical sync frequency of the rendering device.

14. The method of claim 1, wherein a duration of an asynchronous time warp (ATW) is based at least in part on the one or more frames arriving at the display device before or after a vertical sync.

15. An apparatus for performing frequency synchronization and phase correction, comprising:
    receiving, from a display device, a vertical sync count and an indication of one or more frame repeats;
    estimating a vertical sync frequency based at least in part on the received vertical sync count;
    determining a phase corresponding to a minimum frame repeat based at least in part on the indication of the one or more frame repeats;
    adjusting a vertical sync frequency of the apparatus to the estimated vertical sync frequency and a phase of the apparatus to the determined phase; and
    transmitting one or more frames to the display device using the adjusted frequency and the adjusted phase.

16. A rendering device, comprising:
    a processor;
    memory in electronic communication with the processor; and
    instructions stored in the memory and executable by the processor to cause the rendering device to:

receive, from a display device, a vertical sync count and an indication of one or more frame repeats;

estimate a vertical sync frequency based at least in part on the received vertical sync count;

determine a phase corresponding to a minimum frame repeat based at least in part on the indication of the one or more frame repeats;

adjust a vertical sync frequency of the rendering device to the estimated vertical sync frequency and a phase of the rendering device to the determined phase; and transmit one or more frames to the display device using the adjusted frequency and the adjusted phase.

17. The rendering device of claim 16, wherein the instructions are further executable by the processor to cause the rendering device to:

compare the vertical sync count and a preceding vertical sync count received from the display device over a time interval, wherein the instructions to estimate the vertical sync frequency are further based at least in part on the comparing.

18. The rendering device of claim 16, wherein the instructions are further executable by the processor to cause the rendering device to:

identify a quantity of predicted frames (P-frames) and a quantity of intra-frames (I-frames), wherein the one or more frames comprise at least one of the P-frames and at least one of the I-frames;

initiate rendering the I-frames at a first time;

initiate rendering the P-frames at a second time after the first time; and transmit the I-frames and the P-frames to the display device based at least in part on initiating the rendering such that the rendered I-frames arrive at the display device at a same phase as the P-frames.

19. The rendering device of claim 18, wherein the instructions are further executable by the processor to cause the rendering device to:

determine a quantity of frame repeats occurring within a time interval based at least in part on the indication;

determine the minimum frame repeat based at least in part on the quantity of frame repeats occurring within the time interval; and identify a phase corresponding to the determined minimum frame repeat.

20. The rendering device of claim 19, wherein the instructions are further executable by the processor to cause the rendering device to:

compare the quantity of frame repeats, one or more vertical syncs, or a frame frequency, or a combination thereof, wherein the instructions to determine the minimum frame repeat and identify the phase corresponding to the minimum frame repeat is further based at least in part on the comparing.

* * * * *